United States Patent [19]

Pless

[11] 4,257,616

[45] Mar. 24, 1981

[54] PHONOGRAPH RECORD CLEANING DEVICE

[75] Inventor: Ernst Pless, Vienna, Austria

[73] Assignee: Viennaplex Fabrik für Kunststofferzeugnisse Ernst Pless KG, Austria

[21] Appl. No.: 16,073

[22] Filed: Feb. 28, 1979

[30] Foreign Application Priority Data

May 22, 1978 [AT] Austria ................. 3694/78

[51] Int. Cl.³ .............................................. G11B 3/58
[52] U.S. Cl. ..................... 15/230; 15/104 A; 15/DIG. 14; 401/118; 401/126; 401/131; 401/208; 401/37
[58] Field of Search .................. 401/37, 38, 118, 121, 401/126, 129, 130, 131, 196, 207, 21, 218, 208; 274/47; 15/104 A, 230, 230.11

[56] References Cited

U.S. PATENT DOCUMENTS

| | | | |
|---|---|---|---|
| 2,403,575 | 7/1946 | Brack | 401/38 |
| 2,554,302 | 5/1951 | Keskitalo | 401/130 X |
| 2,620,498 | 12/1952 | Jockers et al. | 401/218 |
| 2,660,182 | 11/1953 | Kaul | 15/230.11 X |
| 2,841,808 | 7/1958 | Beyland | 401/121 |
| 3,192,548 | 7/1965 | Wilbrecht | 15/104 A |
| 3,659,952 | 5/1972 | Moransais | 401/196 |
| 3,980,047 | 9/1976 | Cohen et al. | 401/21 X |
| 4,128,909 | 12/1978 | Kawabe et al. | 15/104 A |

FOREIGN PATENT DOCUMENTS

| | | | |
|---|---|---|---|
| 859624 | 12/1952 | Fed. Rep. of Germany | 401/196 |
| 1225407 | 9/1966 | Fed. Rep. of Germany | . |
| 446471 | 4/1936 | United Kingdom | 401/37 |
| 844960 | 8/1960 | United Kingdom | 401/218 |
| 982599 | 2/1965 | United Kingdom | 401/196 |

*Primary Examiner*—Steven A. Bratlie
*Attorney, Agent, or Firm*—McGlew and Tuttle

[57] ABSTRACT

A cleaning device for cleaning phonograph records comprises a grip member with at least one cleaning insert engaged with the grip member and having a record engaging cleaning surface which projects outwardly therefrom which is adapted to rest upon a record to be cleaned. The surface may advantageously be covered by a ribbon or other cleaning cloth which may be wetted with a cleaning liquid. The grip member is provided with a bearing pressure weight member which acts through the grip member on the insert to apply a predetermined cleaning pressure to the record. The grip member advantageously comprises a member having a trough facing outwardly from each side into which an insert is positioned and a weight member is disposed therebetween the trough members. One of the inserts is adapted to rest in a cleaning housing or case so that it contacts a wick which is wetted with cleaning liquid so that its surface or the surface of a cleaning cloth wrapped therearound is wetted at all times.

5 Claims, 4 Drawing Figures

PHONOGRAPH RECORD CLEANING DEVICE

BACKGROUND OF THE INVENTION

1. Field of the Invention

The invention relates in general to record cleaning devices and in particular to a new and useful cleaning device for phonograph records including a grip and a cleaning insert with a cleaning ribbon, receiving a cleaning fluid if necessary. Furthermore the invention concerns a dosing device with cleaning fluid for this cleaning device.

2. Description of the Prior Art

Since the quality of the sound in playing a record is greatly impaired by impurities, particularly in the record grooves, various devices for cleaning the records already have been suggested. Known are cleaning brushes resting directly on the record surface in front of the scanning needle, which are secured on the pickup arm itself and which clean the record during the playback, and cleaning cloths, brushes or cotton waddings for cleaning the record before it is placed on the turntable. If necessary, a cleaning fluid is used together with the cleaning devices. Since any impairment of the movement of the record during the playback, and thus any pressure on the record must be avoided as far as possible, the brushes secured on the pickup arm or on a separate carrier provided for cleaning during the playback have the disadvantage that an effective cleaning is hardly possible. Cleaning a record before it is placed on the turntable involves the risk that the record will get dirty again until it is played, particularly while it is placed on the turntable.

SUMMARY OF THE INVENTION

These disadvantages are avoided by the invention, which permits cleaning of the record on the turntable, but before it is played, that is, before the needle is placed on the record.

This is achieved with the above-described cleaning device according to the invention in this way that a weight adapted to the bearing pressure necessary for cleaning the record is arranged in the cleaning device.

The cleaning device according to the invention extending over the entire width of the part of the record carrying the recording permit rapid and safe removal of all impurities from the record immediately before playback. The cleaning device containing an adapted weight according to the invention can be placed without any risk on the record rotating on the turntable, and the person holding the device can obtain a reliable cleaning of the record without any uncontrolled pressure exerted by him.

According to a preferred embodiment of the invention, the weight can be designed as a metal cylinder and be arranged together with an elastic paraxial cylinder inside the cleaning ribbon designed as an endless ribbon. Furthermore the metal cylinder can be arranged in a preferred embodiment of the invention inside an elongated hollow grip, which is open at the bottom, and the elastic cylinder can be mounted directly in front of its opening.

Another embodiment according to the invention is characterized in that the weight is designed as a prismatic or cylindrical body and is fixedly mounted in the grip. This design yields a handy device that leaves various forms of the cleaning insert open, which can be designed as a disposable part, which greatly simplifies the maintenance of the device.

Another embodiment, based on the foregoing one is characterized in that the grip has two diametrically opposed troughs relative to the weight, in each of which is inserted an elastic cylinder covered with a cleaning ribbon. A cleaning device of this type permits special cleaning effects in that one cleaning ribbon can be used in the dry state, and the other in the wet state, that is, saturated with a cleaning fluid. Besides, the easy exchangeability of the cleaning insert is maintained in this device too.

At this point it should be mentioned that cleaning fluids for phonograph records are known in various compositions, e.g. alcohol diluted with water.

The invention also extends to a dosing device with cleaning fluid for a cleaning device of the type according to the invention. As mentioned above, the use of a cleaning fluid for phonograph records is already known. Usually a separate supply of the cleaning fluid is used, from which a certain amount is transferred to the cleaning device when needed. The separate storage of cleaning device and cleaning fluid leads to known inconveniences, like loss of one or the other, or insufficient monitoring of the fluid supply.

By providing a dosing device with cleaning fluid in connection with a cleaning device according to the invention, these disadvantages are at least reduced.

A dosing device according to the invention with cleaning fluid for a cleaning device of the above described type is characterized by a trough-shaped vessel enclosing at least the elastic cylinder of the grip of the cleaning device for receiving the cleaning fluid, in which is arranged close to the bottom a wick dipping into the cleaning fluid, which extends parallel to the introduced elastic cylinder.

The cleaning device and a supply of cleaning fluid are thus combined to a single object, that is, the supply of cleaning fluid can be easily monitored, and the cleaning insert is always uniformly supplied by the wick in the dosing device with a sufficient, but not excessive amount of cleaning fluid.

It is advisable to place into the vessel an insert forming an intermediate bottom, which carries the wick protruding through openings into the cleaning fluid. This detail contributes a great deal to an economic dosage of the fluid.

The vessel can be provided with advantage with a detachable cover, which imparts to the cleaning device and dosing device a good service value.

Accordingly, it is an object of the invention to provide an improved cleaning device for phonograph records which comprises a grip member, at least one cleaning insert engaged with the grip member, and having a record engaging cleaning surface projecting outwardly therefrom, which is adapted to rest upon a record to be cleaned and including a bearing pressure weight member associated with the grip member and of a predetermined weight which acts on the grip member and the cleaning insert to apply a selected bearing pressure to the record.

A further object of the invention is to provide a cleaning device for phonograph records which is simple in design, rugged in construction, and economical to manufacture.

The various features of novelty which characterize the invention are pointed out with particularity in the claims annexed to and forming a part of this disclosure.

For a better understanding of the invention, its operating advantages and specific objects attained by its uses, reference is made to the accompanying drawings and descriptive matter in which preferred embodiments of the invention are illustrated.

GENERAL DESCRIPTION OF THE PREFERRED EMBODIMENTS

Figure 1:
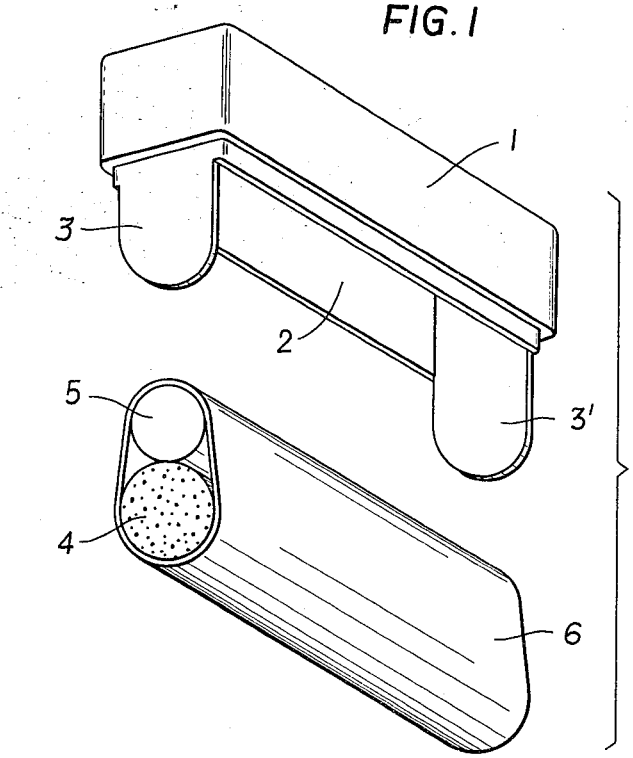
FIG. 1 is an exploded perspective view of a cleaning device for records constructed in accordance with the invention.
Figure 2:
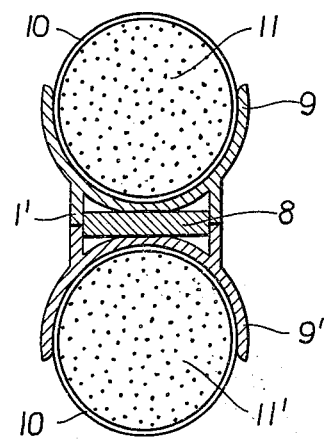
FIG. 2 is a transverse sectional view of another embodiment of cleaning device.

Referring to the drawings in particular, the invention embodied therein in FIGS. 1 and 2 comprises a cleaning device for phonograph records which comprises a grip member or grip 1 which receives a cleaning insert having a surface which may be directly engaged on a record, that is, preferably provided with an endless ribbon or cleaning cloth 6 which engages a record for cleaning purposes.

FIG. 1 shows an elongated prismatic hand grip 1 which is hollow. On its underside, the hand grip 1 has an opening 2 extending over its entire length and width, and in the transverse extension of its narrow sides is provided with end bearing brackets 3 and 3'. Between the bearing brackets 3 and 3' is arranged an elastic cylinder 4 of foam rubber, which is held rotatably by the two bearing brackets 3 and 3' parallel to the length of the grip member.

Parallel to and abutting the elastic cylinder 4 is arranged a cylinder 5 made of metal, e.g. steel. The weight of this cylinder 5 is adapted to provide a bearing pressure necessary for cleaning the record.

Elastic cylinder 4 and metal cylinder 5 are together enclosed by the cleaning ribbon 6 which is designed as an endless ribbon. Cleaning ribbon 6 advantageously comprises a velvet or felt and it is wetted by means of a doser, for example, a dosing bottle or a dosing device according to the invention with a cleaning fluid, e.g. of distilled water with 5% alcohol.

The cleaning insert consisting of elastic cylinder 4, metal cylinder 5, and cleaning ribbon 6, is so inserted into grip 1 that metal cylinder 5 is inside the hollow grip, and elastic cylinder 4 is held by the two bearing brackets 3. By turning of the two cylinders the portion of the cleaning ribbon to contact the record is advanced or varied and a new area of cleaning ribbon 6 can be used for the cleaning process.

For cleaning a phonograph record, the cleaning device according to the invention is placed on the record on the turntable and the turntable is rotated. The weight of the metal cylinder 5 is selected to ensure an absolutely safe cleaning of the record.

The embodiment represented in FIG. 1 can be so varied that metal cylinder 5 is fixedly mounted in grip 1, while the cleaning insert is formed only of elastic cylinder 4 covered with a cleaning ribbon 6. This cleaning insert is then held rotatably between the two bearing brackets 3. The operation of this variant is the same as that of the embodiment in FIG. 1.

An alternate embodiment according to FIG. 2, includes a grip 1', which has in a rough approximation the form of an H in its cross section. In the crossbeam of the H, a prismatic or cylindrical metal weight is fixedly mounted. The longitudinal beams of the H-shaped grip 1' form troughs 9, 9' arranged diametrically opposed to weight 8. Into each of these troughs is inserted a respective cleaning insert 11 and 11', both formed of a foam rubber cylinder and covered by a cleaning ribbon 10, which can turn in the trough. Of the two cleaning inserts 11 and 11', one is dry and the other is wet.

Figure 3:
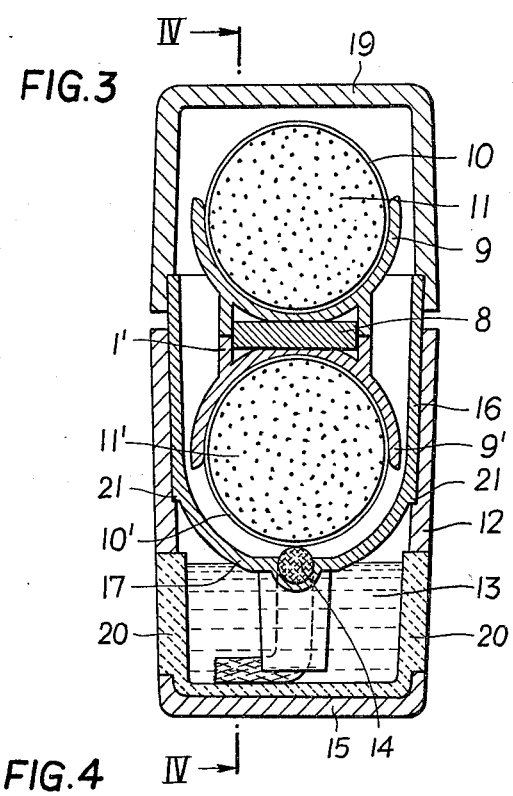
FIG. 3 is a transverse sectional view of the cleaning device shown in FIG. 2 arranged in a cleaning liquid dispensing housing.
Figure 4:
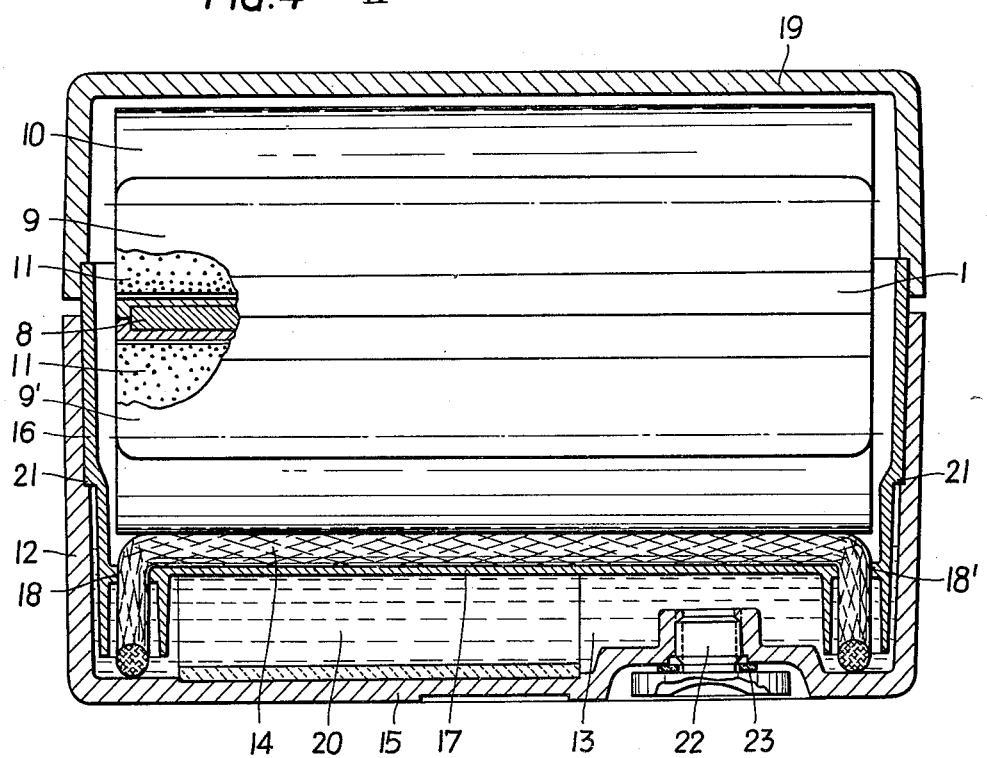
FIG. 4 is a section taken along the line 4—4 of FIG. 3.

FIGS. 3 and 4 show in a cross and longitudinal section, respectively a cleaning device according to FIG. 2 which includes a dosing device with cleaning fluid. The cleaning device is here provided with the same reference numbers as in FIG. 2.

The dosing device includes a trough-shaped vessel 12, which is filled with some cleaning fluid, 13. In the longitudinal walls of vessel 12 are provided inspection glasses 20, through which the level of the fluid can be inspected. In vessel 12 is arranged an insert 16, which has likewise the form of a trough and which bears with shoulders 21 on vessel 12, so that bottom 17 of the trough is slightly above bottom 15 of vessel 12.

In bottom 17 of the trough (of the insert part) 16 is provided a longitudinal groove (not numbered), into which is inserted a wick 14, whose two ends protrude through openings 18, 18' in bottom 17 into cleaning fluid 13. Grip 1 of the cleaning device is inserted loosely into vessel 12 and rests with one of its cleaning inserts 11' and ribbons 10' on wick 14, so that the wick 14 now transfers a certain amount of cleaning fluid to cleaning ribbon 10' where it spreads further due to its porosity. The amount of cleaning fluid thus applied suffices at least for a single cleaning of the record.

Vessel 12 is preferably tightly closed by a cover 19. On its bottom 15 can be provided a filling hole, which can be closed with a screw plug 22 with gasket 23.

In the dosing device described and represented above, the upper cleaning cylinder with cleaning ribbon 10, 11 remains dry, while the lower cylinder is wetted. These states should always be maintained. For identification, grip 1 can consist of two parts of different colors, or the cleaning ribbons can be distinguished by different colors. The above-described dosing device can also be used with other embodiments of the cleaning device, as it will be readily understood. As mentioned above, special velvet with directed bristles is particularly suitable as a cleaning ribbon 6 or 10, and foam rubber or any foam can be used for the elastic cylinders 4 and 11.

While specific embodiments of the invention have been shown and described in detail to illustrate the application of the principles of the invention, it will be understood that the invention may be embodied otherwise without departing from such principles.

What is claimed is:

1. A cleaning device for phonograph records comprising an elongated grip member, an elastic cylinder, means for rotatably mounting said elastic cylinder to said grip member parallel to the length thereof, pressure means operatively connected to said grip member for providing a selected bearing pressure on a record to be cleaned sufficient for cleaning the record, cleaning means for engaging the record to be cleaned carried on said elastic cylinder including a portion for cleaning a record, said cleaning means being movable responsive to rotation of said elastic cylinder to vary the portion used for cleaning the record, and said grip member has first and second oppositely facing troughs, and said elastic cylinder comprises a cylindrical member in each of said troughs.

2. The cleaning device according to claim 1 wherein said pressure means comprises a weight member fixedly connected to said grip member intermediate said troughs.

3. A cleaning device for phonograph records comprising an elongated grip member, an elastic cylinder, means for rotatably mounting said elastic cylinder to said grip member parallel to the length thereof, pressure means operatively connected to said grip member for providing a selected bearing pressure on a record to be cleaned sufficient for cleaning the record, cleaning means for engaging the record to be cleaned carried on said elastic cylinder including a portion for cleaning a record, said cleaning means being movable responsive to rotation of said elastic cylinder to vary the portion used for cleaning the record, and wherein said pressure means comprises a metal cylinder rotatably arranged parallel to and contacting said elastic cylinder, and said cleaning means comprises an endless cleaning ribbon engaged around said metal cylinder and said elastic cylinder.

4. The cleaning device according to claim 3 wherein said mounting means comprises a plurality of end bearing brackets, transversely extending from each end of said grip member.

5. The cleaning device according to claim 4 wherein said elastic cylinder comprises foam rubber.

* * * * *